US012654644B2

(12) United States Patent
Shimizu

(10) Patent No.: US 12,654,644 B2
(45) Date of Patent: Jun. 16, 2026

(54) DEVICE-OPERATION CONTROL SYSTEM, DEVICE-OPERATION CONTROL APPARATUS, DEVICE-OPERATION CONTROL METHOD, AND COMPUTER-READABLE MEDIUM

(71) Applicant: NEC Corporation, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 18/723,928

(22) PCT Filed: Jan. 6, 2022

(86) PCT No.: PCT/JP2022/000283
§ 371 (c)(1),
(2) Date: Jun. 25, 2024

(87) PCT Pub. No.: WO2023/132041
PCT Pub. Date: Jul. 13, 2023

(65) Prior Publication Data
US 2025/0058730 A1 Feb. 20, 2025

(51) Int. Cl.
| | |
|---|---|
| *B60R 21/01* | (2006.01) |
| *B60R 21/015* | (2006.01) |
| *G06F 3/01* | (2006.01) |
| *G06T 7/70* | (2017.01) |
| *G06V 20/59* | (2022.01) |
| *G06V 40/16* | (2022.01) |
| *G06V 40/18* | (2022.01) |

(52) U.S. Cl.
CPC ............ *B60R 21/015* (2013.01); *G06F 3/013* (2013.01); *G06T 7/70* (2017.01); *G06V 20/597* (2022.01); *G06V 40/178* (2022.01)

(58) Field of Classification Search
CPC .... G06V 20/597; G06V 40/178; G06F 3/013; G06T 7/70; B60K 35/235; B60R 16/02; B60R 21/015; A01K 7/02; A01K 29/005; A01K 11/006; G01S 13/88; G01S 13/931
See application file for complete search history.

(56) References Cited

U.S. PATENT DOCUMENTS

| | | | |
|---|---|---|---|
| 11,932,156 B2 * | 3/2024 | Salter | ....................... A01K 7/02 |
| 2016/0342849 A1 * | 11/2016 | Kiyo | ..................... G01S 13/867 |

FOREIGN PATENT DOCUMENTS

| | | |
|---|---|---|
| JP | H10-315906 A | 12/1998 |
| JP | 2007-118626 A | 5/2007 |

(Continued)

OTHER PUBLICATIONS

JP 2007118626—English Translation Version.*

(Continued)

*Primary Examiner* — Logan M Kraft
*Assistant Examiner* — Johnny H Hoang
(74) *Attorney, Agent, or Firm* — Sughrue Mion, PLLC

(57) ABSTRACT

A locating means identifies a location of at least one vehicle occupant in a vehicle. An attribute identifying means identifies an attribute of the at least one vehicle occupant from an image captured by a camera for capturing an image of inside of the vehicle. A control means performs control of a device inside the vehicle based on the location identified by the locating means and the attribute identified by the attribute identifying means.

10 Claims, 9 Drawing Sheets

(56)　　　　　　　References Cited

FOREIGN PATENT DOCUMENTS

| JP | 2012-236444 | A | 12/2012 |
| JP | 2020-087207 | A | 6/2020 |
| JP | 2021-102357 | A | 7/2021 |

OTHER PUBLICATIONS

JP 2021-102357—Englesh Translation Version.*
International Search Report for PCT Application No. PCT/JP2022/
000283, mailed on Mar. 1, 2022.

* cited by examiner

| LOCATION OF VEHICLE OCCUPANT IN VEHICLE | ATTRIBUTES | DEVICE-TO-BE-CONTROLLED 1 | DEVICE-TO-BE-CONTROLLED 2 | ... | DEVICE-TO-BE-CONTROLLED n |
|---|---|---|---|---|---|
| DRIVER SEAT | ADULT | YES | YES | ... | NO |
| | CHILD | NO | NO | ... | NO |
| PASSENGER SEAT | ADULT | NO | YES | ... | NO |
| | CHILD | NO | NO | ... | NO |
| REAR RIGHT SEAT | ADULT | NO | NO | ... | YES |
| | CHILD | NO | NO | ... | YES |
| REAR LEFT SEAT | ADULT | NO | NO | ... | YES |
| | CHILD | NO | NO | ... | YES |

Fig. 3

| PLURALITY OF VEHICLE OCCUPANTS? | ANY ADULT? | ANY CHILD? | ADULT LOOKING AT CHILD? | FACE AUTHENTICATION SUCCESSFUL? | OPERATE STEERING WHEEL | OPERATE HORN | ACTIVATE ENGINE |
|---|---|---|---|---|---|---|---|
| NO | NO | YES | NO | YES | NO | NO | NO |
| NO | YES | NO | NO | YES | YES | YES | YES |
| YES | YES | YES | NO | YES | YES | NO | NO |
| YES | YES | YES | YES | YES | YES | YES | YES |

Fig. 6

| ATTRIBUTE: CHILD | POWER WINDOW | ENGINE | PARKING BRAKE |
|---|---|---|---|
| VEHICLE IN OPERATION | NO | NO | NO |
| SHIFT POSITION: P<br>PARKING BRAKE:ON | YES | YES | NO |
| SHIFT POSITION: P<br>PARKING BRAKE:OFF | YES | NO | YES |

Fig. 8

DEVICE-OPERATION CONTROL SYSTEM, DEVICE-OPERATION CONTROL APPARATUS, DEVICE-OPERATION CONTROL METHOD, AND COMPUTER-READABLE MEDIUM

This application is a National Stage Entry of PCT/JP2022/000283 filed on Jan. 6, 2022, the contents of all of which are incorporated herein by reference, in their entirety.

TECHNICAL FIELD

The present disclosure relates to a device-operation control system, a device-operation control apparatus, a device-operation control method and a computer-readable medium.

BACKGROUND ART

As a related art, Patent Literature 1 discloses a control apparatus for vehicle-mounted devices. In Patent Literature 1, each seat of a vehicle has a load sensor. The control apparatus described in Patent Literature 1 acquires the distribution of the load on the seat surface of a seat from the load detected by the load sensor. The control apparatus determines, from the acquired distribution of the load, whether or not the vehicle occupant is an adult. In the case where the control apparatus determines that the vehicle occupant is an adult, it acquired information about the position of the seat in which the vehicle occupant is seated. The control apparatus determines whether or not the operation of a device by a vehicle occupant is to be permitted by referring to the information about the position of the seat of the vehicle occupant who is to operate the device and the traveling state of the vehicle. The control apparatus prohibits the operation of the device by a vehicle occupant when it determines that the vehicle occupant is not an adult.

CITATION LIST

Patent Literature

Patent Literature 1: Japanese Unexamined Patent Application Publication No. 2012-236444

SUMMARY OF INVENTION

Technical Problem

The control apparatus described in Patent Literature 1 determines whether the vehicle occupant is an adult or a child according to the load detected by the load sensor. In Patent Literature 1, since an adult and a child can be distinguished only by their weights, an adult with a light weight may be erroneously determined as a child. Alternatively, a child with a heavy weight may be erroneously determined as an adult. Thus, the apparatus described in Patent Literature 1 cannot accurately determine the attributes of the vehicle occupant and cannot perform control of the devices based on the attributes of the vehicle occupant.

In view of the above circumstances, an object of the present disclosure is to provide a device-operation control system, a device-operation control apparatus, a device-operation control method, and a computer-readable medium each adapted to control devices based on the attributes of the vehicle occupants.

Solution to Problem

To achieve the above object, according to a first aspect of the present disclosure a device-operation control apparatus is provided.

A device-operation control apparatus includes:

locating means for identifying a location of at least one vehicle occupant in a vehicle;

attribute identifying means for identifying an attribute of the at least one vehicle occupant from an image captured by a camera for capturing an image of inside of the vehicle; and control means for performing control of a device inside the vehicle based on the identified location and the identified attribute.

According to a second aspect of the present disclosure a device-operation control system is provided.

A device-operation control system includes:

a camera for capturing an image of inside of a vehicle; and a device-operation control apparatus for performing control of a device inside the vehicle.

The device-operation control apparatus includes:

locating means for identifying a location of at least one vehicle occupant in the vehicle;

attribute identifying means for identifying an attribute of the at least one vehicle occupant from an image captured by the camera; and control means for performing control of the device based on the identified location and the identified attribute.

According to a third aspect of the present disclosure, a device-operation control method is provided.

A device-operation control method includes:

identifying a location of at least one vehicle occupant in a vehicle;

identifying an attribute of the at least one vehicle occupant from an image captured by a camera for capturing an image of inside of the vehicle; and performing control of a device inside the vehicle based on the identified location and the identified attribute.

According to a fourth aspect of the present disclosure, a computer-readable medium is provided.

A computer-readable medium stores a program for causing a processor to execute processes including:

identifying a location of at least one vehicle occupant in a vehicle;

identifying an attribute of the at least one vehicle occupant from an image captured by a camera for capturing an image of inside of the vehicle; and performing control of a device inside the vehicle based on the identified location and the identified attribute.

Advantageous Effects of Invention

A device-operation control system, a device-operation control apparatus, a device-operation control method, and a computer-readable medium according to the present disclosure are each adapted to control devices based on the attributes of the vehicle occupants in the vehicle.

BRIEF DESCRIPTION OF DRAWINGS

FIG. 3 is a diagram illustrating an example of a relationship between the location of each vehicle occupant and the attributes of each vehicle occupant and whether or not the operation of each device-to-be-controlled is to be permitted;

FIG. 6 is a diagram illustrating an example of a relationship between the location in a vehicle, the attributes, and the status information of vehicle occupants and whether or not the operation of each device-to-be-controlled is to be permitted;

FIG. 8 is a diagram illustrating an example of whether or not the operation of a device-to-be-controlled is to be permitted based on the vehicle status information.

EXAMPLE EMBODIMENT

Figure 1:
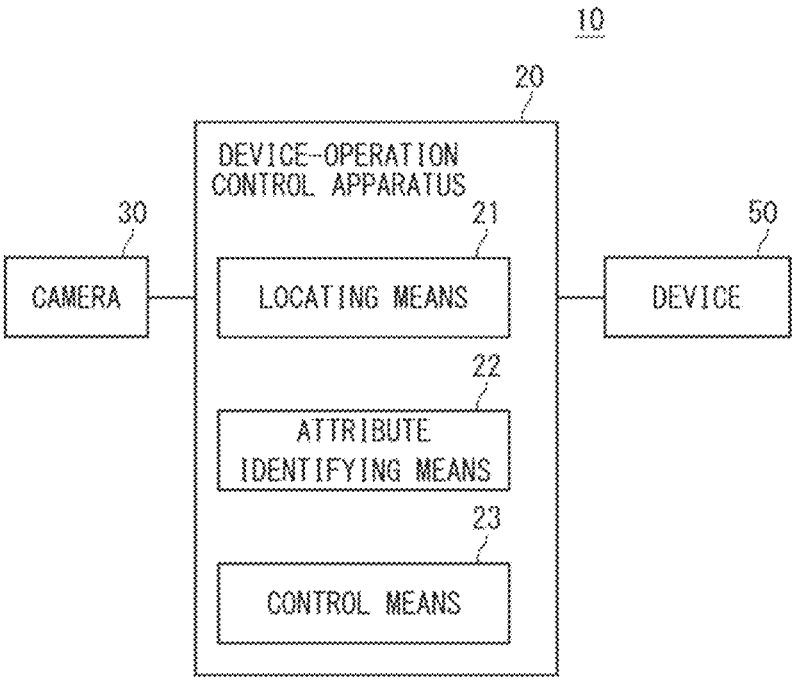
FIG. 1 is a block diagram showing a schematic configuration of a device-operation control system according to the present disclosure.

An overview of the present disclosure will be described prior to giving the description of the example embodiments of the present disclosure. FIG. 1 shows a schematic configuration of a device-operation control system according to the present disclosure. A device-operation control system 10 includes a device-operation control apparatus 20 and a camera 30. The camera 30 captures an image of the inside of the vehicle. The device-operation control apparatus 20 performs control of a device 50 inside the vehicle.

The device-operation control apparatus 20 has a locating means 21, an attribute identifying means 22, and a control means 23. The locating means 21 identifies the location of at least one vehicle occupant in the vehicle. The attribute identifying means 22 identifies the attribute of at least one vehicle occupants from the image captured by the camera 30. The control means 23 performs control of the device 50 inside the vehicle based on the identified location and the identified attributes.

In the present disclosure, the attribute identifying means 22 identifies the attributes of the vehicle occupants by referring to the image captured by the camera 30. In the present disclosure, since the camera image is used for identifying the attribute, the attribute can be identified more accurately than when distinguishing between an adult and a child using a load sensor. Therefore, the device-operation control apparatus 20 can realize control of a device based on the attributes of the vehicle occupants in the vehicle.

Example embodiments of the present disclosure will be described in detail below with reference to the drawings. The following descriptions and drawings have been omitted and simplified as appropriate for clarity of explanation. In each drawing, the same elements and similar elements have the same reference numerals, and duplicate explanations have been omitted as necessary.

Figure 2:
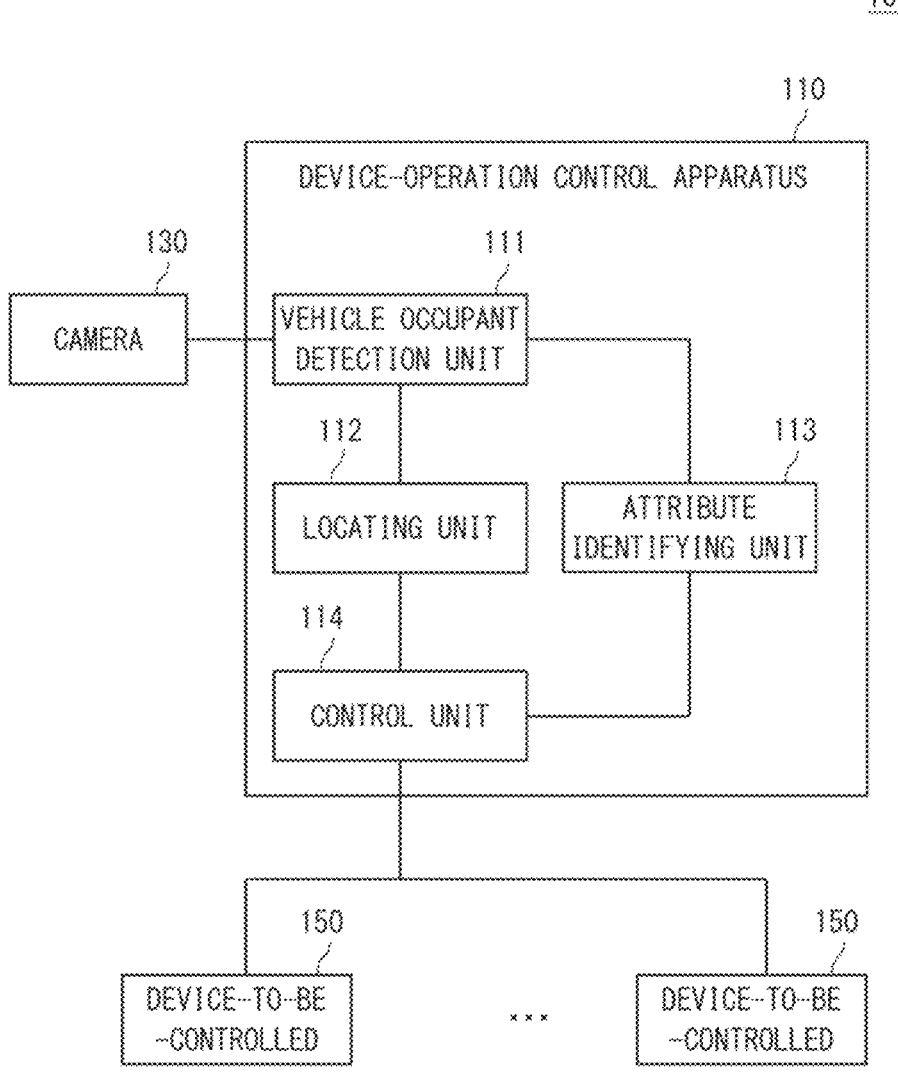
FIG. 2 is a block diagram showing a device-operation control system according to the first example embodiment of the present disclosure.

FIG. 2 shows a device-operation control system according to the first example embodiment of the present disclosure. A device-operation control system 100 includes a device-operation control apparatus 110 and a camera 130. The camera 130 is mounted on a vehicle and captures images of the inside of the vehicle. A vehicle may be a moving object such as a passenger car, a taxi, or a van. The camera 130 is installed, for example, at a position between the driver seat and the passenger seat where the whole inside of the vehicle cabin can be viewed. In the device-operation control system 100, the number of the cameras 130 is not limited to one. The device-operation control system 100 may include a plurality of cameras 130 disposed in one vehicle. The device-operation control system 100 corresponds to the device-operation control system 10 shown in FIG. 1. The camera 130 corresponds to the camera 30 shown in FIG. 1.

The device-operation control apparatus 110 is connected to the camera 130 and a plurality of devices-to-be-controlled 150. A device-to-be-controlled 150 is a device to be operated inside a vehicle by a vehicle occupant in the vehicle. The device-to-be-controlled 150 includes, for example, devices installed in a vehicle or devices operated by a vehicle occupant while the vehicle is being operated. For example, the device-to-be-controlled 150 includes devices such as the engine (the main switch), power windows, a horn, a steering wheel, a parking brake, and an air conditioner. The device-to-be-controlled 150 may include display audio (DA) and on-board devices such as a vehicle navigation device. In addition, the device-to-be-controlled 150 may be a user device such as a smartphone that a vehicle occupant brings into the vehicle. The device-to-be-controlled 150 corresponds to the device 50 shown in FIG. 1.

The device-operation control apparatus 110 obtains the image captured by the camera 130, and performs control of the device-to-be-controlled 150 using the obtained image. The device-operation control apparatus 110 includes a vehicle occupant detection unit 111, a locating unit 112, an attribute identifying unit 113, and a control unit 114. The device-operation control apparatus 110 is configured to include, for example, at least one processor and at least one memory. At least some of the functions of the components in the device-operation control apparatus 110 may be implemented by performing processing according to a program read from the memory by the processor. The device-operation control apparatus 110 corresponds to the device-operation control apparatus 20 shown in FIG. 1.

The vehicle occupant detection unit 111 detects a vehicle occupant in the vehicle. The vehicle occupant detection unit 111 detects a vehicle occupant by detecting the facial area of the subject (the vehicle occupant) from the video (image) captured by the camera 130. When the image includes a plurality of subjects and a plurality of facial areas are detected, the vehicle occupant detection unit 111 detects presence of a plurality of vehicle occupants in the vehicle. The locating unit 112 locates the vehicle occupants detected by the vehicle occupant detection unit 111 in the vehicle. The vehicle occupant detection unit 111 may detect the vehicle occupants using a sensor such as a pressure sensor installed in the seats.

When a plurality of vehicle occupants are detected, the locating unit 112 locates each of the plurality of vehicle occupants in the vehicle. The locating unit 112 identifies, for example, which seat each vehicle occupant is seated among the seats of the vehicle. The locating unit 112 locates, for example, each of the vehicle occupants from to the image captured by the camera 130. The locating unit 112 may locate each of the vehicle occupants in the vehicle using a sensor such as a pressure sensor disposed to the seats. The locating unit 112 corresponds to the locating means 21 shown in FIG. 1.

The attribute identifying unit 113 identifies the attribute of a vehicle occupant from the image captured by the camera 130. When a plurality of vehicle occupants are detected, the attribute identifying unit 113 identifies the attribute for each of the plurality of vehicle occupants. The attributes of the vehicle occupants include, for example, age and sex. The attribute identifying unit 113 detects, for example, the facial area in the camera image. The attribute identifying unit 113 may estimate the age and sex, etc. of each vehicle occupant based on the detected facial area, and the estimated age and sex are identified as the attributes of the vehicle occupant. The attribute identifying unit 113 may identify whether the vehicle occupant is an adult or a child based on the estimated age. Alternatively, the attribute identifying unit 113 may identify a person by performing face authentication on the facial area in the camera image. In this case, the attribute identifying unit 113 may acquire attributes of the identified person from a database or the like. In addition, information about restriction on use of the devices may be linked to the person registered in the database, and the information about restriction on use of the devices may be acquired as an attribute of the person identified by the attribute identifying unit 113. The attribute identifying unit 113 corresponds to the attribute identifying means 22 shown in FIG. 1.

The control unit 114 performs control of the device-to-be-controlled 150 based on the location of each vehicle occupant in the vehicle as identified by the locating unit 112 and the attributes of each vehicle occupant as identified by the attribute identifying unit 113. The control unit 114 can control each of a plurality of the devices-to-be-controlled 150 individually. For example, when a vehicle occupant attempts to operate a device-to-be-controlled 150, the control unit 114 determines whether or not to permit the operation of that device-to-be-controlled 150 based on the location of the vehicle occupant in the vehicle and the attributes of the vehicle occupant. For example, the control unit 114 may determine whether or not to permit operation of the device-to-be-controlled 150 by a vehicle occupant based on the location of the vehicle occupant in the vehicle and whether the vehicle occupant is an adult or a child. The control unit 114 does not restrict use of the device-to-be-controlled 150 by the vehicle occupant when it determines to permit the vehicle occupant to operate the device. In this case, the device-to-be-controlled 150 is operated in accordance with the operation performed by the vehicle occupant. In the case where the control unit 114 determines not to permit the vehicle occupant to operate the device-to-be-controlled 150, even when the vehicle occupant attempts to operate the device-to-be-controlled 150, the operation is disabled by the control unit thereby restricting use of the device-to-be-controlled 150 by the vehicle occupant. The control unit 114 may restrict use of a part of the functions of the device-to-be-controlled 150 rather than restricting use of all of the functions of the device-to-be-controlled 150. The control unit 114 corresponds to the control means 23 shown in the drawings.

In the case where the device-to-be-controlled 150 is a device installed in a vehicle or a vehicle-mounted device, the control unit 114 may control the device-to-be-controlled 150 by transmitting a control signal through the in-vehicle network to the device-to-be-controlled 150. In the case where the device-to-be-controlled 150 is a user device such as a smartphone, the user device may have an application installed therein so that it can communicate with the device-operation control apparatus 110. When the control unit 114 determines that the operation of the device-to-be-controlled 150, which is the user device, is not to be permitted, it notifies the user device to that effect. When the application receives a notification that the operation of the user device is not permitted, it disables a certain function of the user device, such as displaying a screen. In this manner, the control unit 114 can restrict the operation or use of the user device within the vehicle by the vehicle occupant.

FIG. 3 illustrates an example of a relationship between the location of each vehicle occupant in a vehicle and the attributes of each vehicle occupant and whether or not the operation of each device-to-be-controlled is to be permitted. In this example, it is assumed that the locating unit 112 identifies whether the vehicle occupant is in the front right seat (the driver seat for right-hand traffic), the front left seat (the passenger seat), the rear right seat, or the rear left seat. It is assumed that the attribute identifying unit 113 also identifies whether the vehicle occupant is an "adult" or a "child". It is assumed that the control unit 114 controls a device-to-be-controlled 1 to a device-to-be-controlled n, where n is an integer equal to or greater than 2.

In FIG. 3, for a combination of the location of a vehicle occupant in the vehicle and the attributes of the vehicle occupant for which the operation of the device-to-be-controlled 150 is to be permitted, a "YES" is indicated. For a combination of the location of a vehicle occupant in the vehicle and the attributes of the vehicle occupant for which the operation of the device-to-be controlled 150 is not to be permitted, a "NO" is indicated. For example, the control unit 114 permits the operation of the "device-to-be-controlled 1" and the "device-to-be-controlled 2" when the attribute of the vehicle occupant in the driver seat is "adult". Alternatively, the control unit 114 permits the operation of the "device-to-be-controlled 2" but not the "device-to-be-controlled 1" when the attribute of the vehicle occupant in the passenger seat is "adult". The control unit 114 does not permit the operation of the "device-to-be-controlled 1" and the "device-to-be-controlled 2" when the attribute of the vehicle occupant in the driver seat or the passenger seat is "child".

The plurality of the devices-to-be-controlled 150 may be divided into a plurality of groups according to the locations (positions) in the vehicle where the devices are installed and the use of the devices, etc. In this case, the control unit 114 keeps information indicating which group each device-to-be-controlled 150 belongs to. One device-to-be-controlled 150 may belong to a plurality of groups. Instead of determining whether or not the operation is to be permitted for each of the plurality of devices-to-be-controlled 150, that is, determining whether or not a restriction on use is imposed for each device-to-be-controlled 150, the control unit 114 may determine whether or not the operation is to be permitted for each group. For example, the control unit 114 may not permit the operation of a device-to-be-controlled 150, such as the engine, a horn, or a steering wheel, that belongs to a device-to-be-controlled group related to the operation of the vehicle when there is no adult in the driver seat. The control unit 114 may permit, even when there is no adult in the driver seat, the operation of a device-to-be-controlled 150 that belongs to a device-to-be-controlled group not related to the operation of the vehicle.

Specifically, the control unit 114 may permit the operation of a device such as an air conditioner, but restrict the operation of an accelerator, for example, when there is no one in the driver seat. The control unit 114 may also restrict the operation of an accelerator and the operation of starting an engine when a vehicle occupant is in the driver seat and the attribute of the vehicle occupant is "child". The control unit 114 may restrict the activation of the system of a vehicle in the case of an electric vehicle. The control unit 114 may restrict, depending on the attributes of the vehicle occupant as identified, the operation of a device disposed near the location of the vehicle occupant in the vehicle as identified by the locating unit 112. The control unit 114 may restrict the operation of the rear right seat power window when the location of the vehicle occupant in the vehicle is the rear right-side seat and the attribute of the vehicle occupant is "child".

Figure 4:
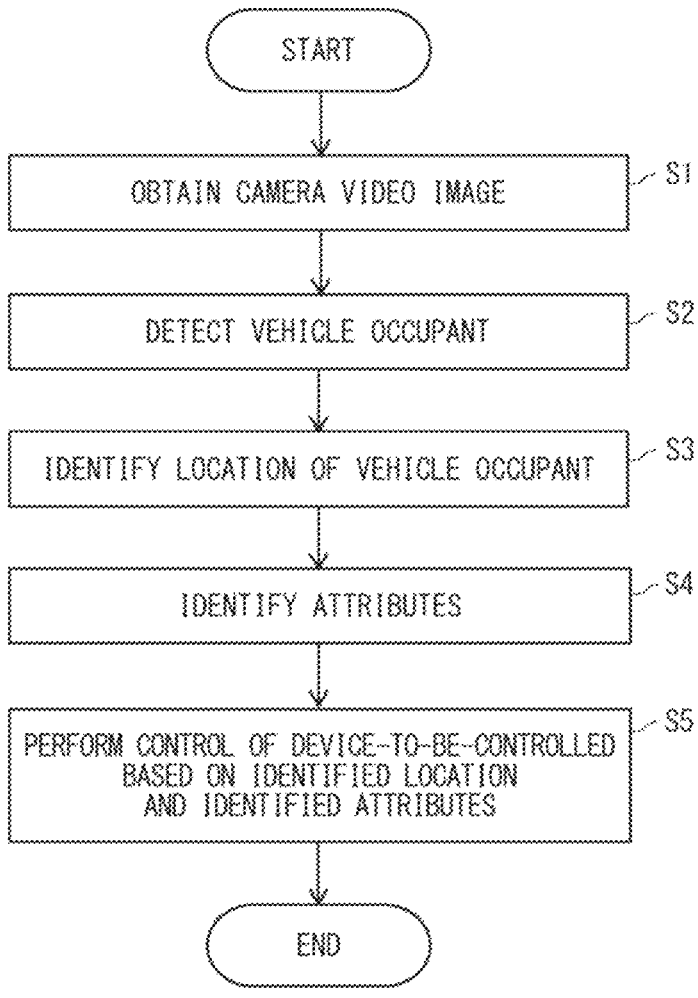
FIG. 4 is a flowchart showing the operation procedure taken in a device-operation control apparatus.

Next, the operation procedure will be described. FIG. 4 shows an operation procedure (device-operation control method) implemented in the device-operation control apparatus 110. The vehicle occupant detection unit 111 obtains a camera image from the camera 130 (Step S1). The vehicle occupant detection unit 111 detects the vehicle occupant in the vehicle based on the camera image (Step S2). The vehicle occupant detection unit 111 performs, for example, face detection on the camera image. When a facial area is detected, the vehicle occupant detection unit 111 detects that a vehicle occupant is in the vehicle.

The locating unit 112 identifies the location of the vehicle occupant in the vehicle in Step S2 (Step S3). The locating unit 112 may track the location of the vehicle occupant in the vehicle after the vehicle occupant has got into the vehicle. The attribute identifying unit 113 identifies the attributes of the vehicle occupant detected in Step S2 from the camera image captured by the camera 130 (Step S4). In Step S4, the attribute identifying unit 113 estimates the age of the vehicle occupant using, for example, the image of the facial area, and identifies whether the vehicle occupant is an adult or a child. The control unit 114 performs control of the device-to-be-controlled 150 based on the location of the vehicle occupant in the vehicle as identified in Step S3 and the attributes of the vehicle occupant as identified in Step S4 (Step S5).

In this example embodiment, the control unit 114 performs control of the device-to-be-controlled 150 based on the location of the vehicle occupant in the vehicle and the attributes of the vehicle occupant. In this example embodiment, the attribute identifying unit 113 identifies the attributes of a vehicle occupant based on the image captured by the camera 130. In this example embodiment, the camera image is referred to in identifying the attributes of the vehicle occupant. Therefore, the attributes of the vehicle occupants can be accurately identified compared with the case of distinguishing between an adult and a child by their weights. The device-operation control apparatus 110 may control the device-to-be-controlled 150 based on the correctly-identified attributes of the vehicle occupant.

For example, a case where a vehicle is parked and an adult is taking a break with a child on his/her lap will be studied. Suppose that a child attempts to operate a device-to-be-controlled 150. According to Patent Literature 1, since whether the vehicle occupant is a child or an adult is distinguished by weight, it is erroneously determined that an adult is trying to operate the device-to-be-controlled 150 in the above case. In contrast, in this example embodiment, since the camera image is referred to in identifying the attributes of a vehicle occupant, it is possible to correctly identify that the vehicle occupant who is attempting to operate a device-to-be-controlled is a child. In this example embodiment, the control unit 114 can improve safety in the vehicle by restricting the operation of a certain device-to-be-controlled 150 by a child.

Figure 5:
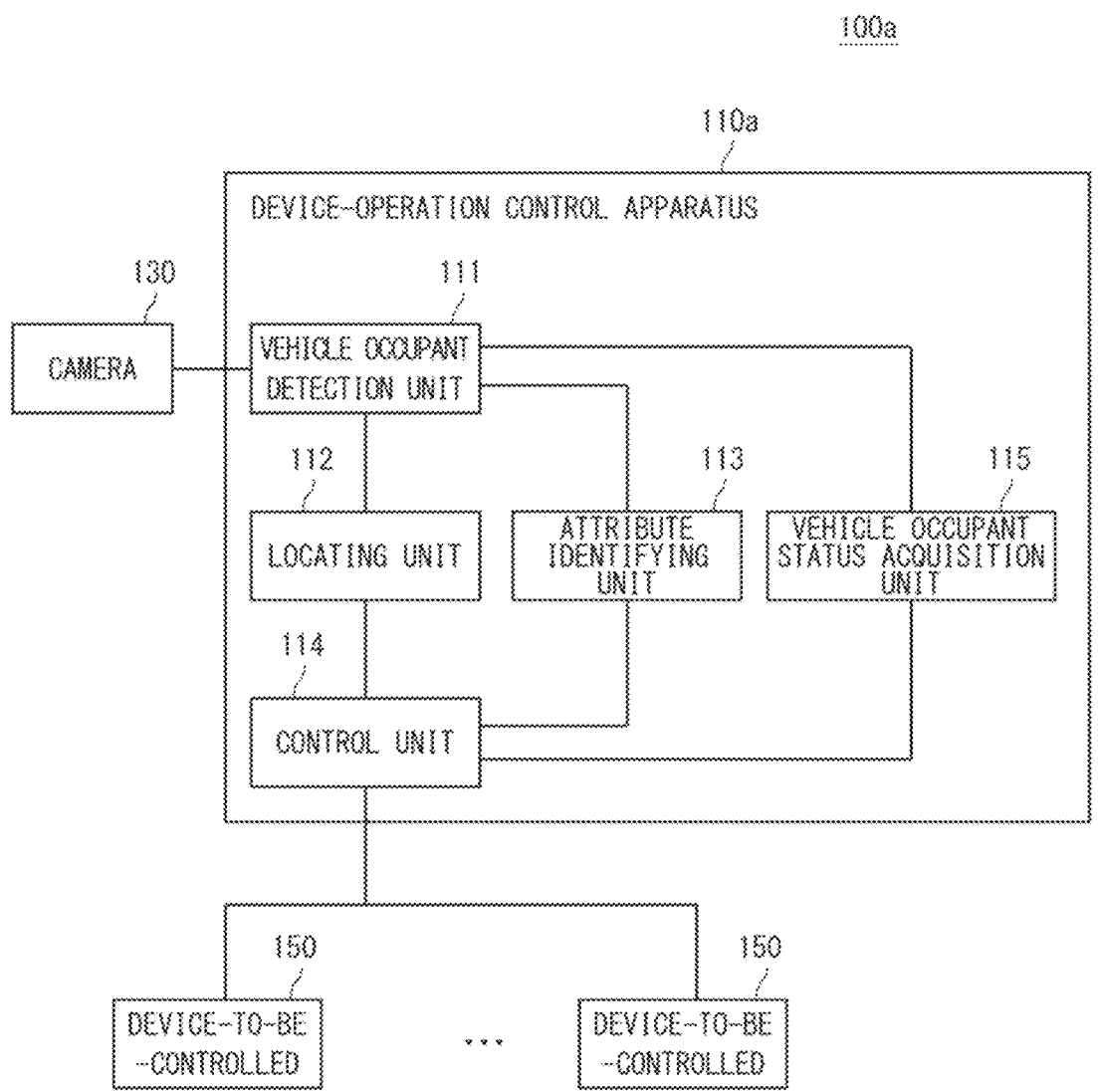
FIG. 5 is a block diagram showing a device-operation control system according to the second example embodiment of the present disclosure.

Next, a second example embodiment according to the present disclosure will be described. FIG. 5 shows a device-operation control system according to the second example embodiment of the present disclosure. A device-operation control system 100a according to this example embodiment includes a vehicle occupant status acquisition unit 115 in addition to the configuration of the device-operation control apparatus 110 according to the first example embodiment shown in FIG. 2.

The vehicle occupant status acquisition unit (vehicle occupant status acquisition means) 115 acquires the status information of vehicle occupants in the vehicle. For example, the vehicle occupant status acquisition unit 115 acquires the face orientation or the direction of line of sight of each vehicle occupant detected by the vehicle occupant detection unit 111 as status information. The vehicle occupant status acquisition unit 115 outputs status information of the vehicle occupant to the control unit 114. The control unit 114 performs control of a device-to-be-controlled 150 using the status information of the vehicle occupant in addition to the location of the vehicle occupant in the vehicle and the attributes of the vehicle occupant.

In this example embodiment, for example, when the vehicle occupants include an adult and a child, the control unit 114 determines whether or not the adult looks at the child based on the status information of the vehicle occupants. The control unit 114 determines, for example, whether or not the adult occupant is facing the child or the line of sight of the adult is directed toward the child. The control unit 114 can determine whether or not the operation of the device-to-be-controlled 150 is to be permitted depending on whether or not the adult looks at the child.

The control unit 114 may control the device-to-be-controlled 150 based on the results of the facial recognition and the status information of the vehicle occupants when facial recognition is performed by the attribute identifying unit 113. For example, the attribute identifying unit 113 identifies whether or not the vehicle occupant is a person registered as a user of the vehicle by performing facial recognition. The control unit 114 may permit the operation of a certain device-to-be-controlled 150 in the case where the vehicle occupant is an adult and registered as a user of the vehicle and the vehicle occupant (adult) looks at a child.

FIG. 6 shows an example of the relationship between the location, the attributes, and the status information of vehicle occupants and whether or not the operation of each device-to-be-controlled is to be permitted. The control unit 114 determines whether or not a plurality of vehicle occupants are detected by the vehicle occupant detection unit 111. When no more than one vehicle occupant is detected, the control unit 114 determines whether or not the operation of the steering wheel and the horn and the activation of the engine are to be permitted depending on whether the vehicle occupant is an adult or a child. In the example shown in FIG. 6, the control unit 114 restricts the operation of the steering wheel and the horn and the activation of the engine in the case where the vehicle occupant is a child. The control unit 114 permits the operation of the steering wheel and the horn and the activation of the engine when the vehicle occupant is an adult.

When more than one vehicle occupant is detected, the control unit 114 determines whether the vehicle occupants include is an adult or a child. When the vehicle occupants include an adult and a child, the control unit 114 determines whether the adult looks at the child. When the control unit 114 determines that the adult does not look at the child, it may permit the operation of the steering wheel but restrict the operation of the horn and the activation of the engines. When the control unit 114 determines that the adult looks at the child, it may permit the operation of the steering wheel and the horn and the activation of the engine, assuming that the child is under the supervision of the adult.

In this example embodiment, the vehicle occupant status acquisition unit 115 acquires status information of the vehicle occupant. The control unit 114 can control a device-to-be-controlled 150 based on the acquired status information. The control unit 114 can, for example, allow a child to operate the device-to-be-controlled 150 when an adult looks at the child and the child is under the supervision of an adult. The control unit 114 can also restrict the operation of the device-to-be-controlled 150 by a child when an adult does not look at the child. Thus, in this example embodiment, a child can operate the device-to-be-controlled 150 when an adult looks at the child. Other effects may be the same as those described in the first example embodiment.

Figure 7:
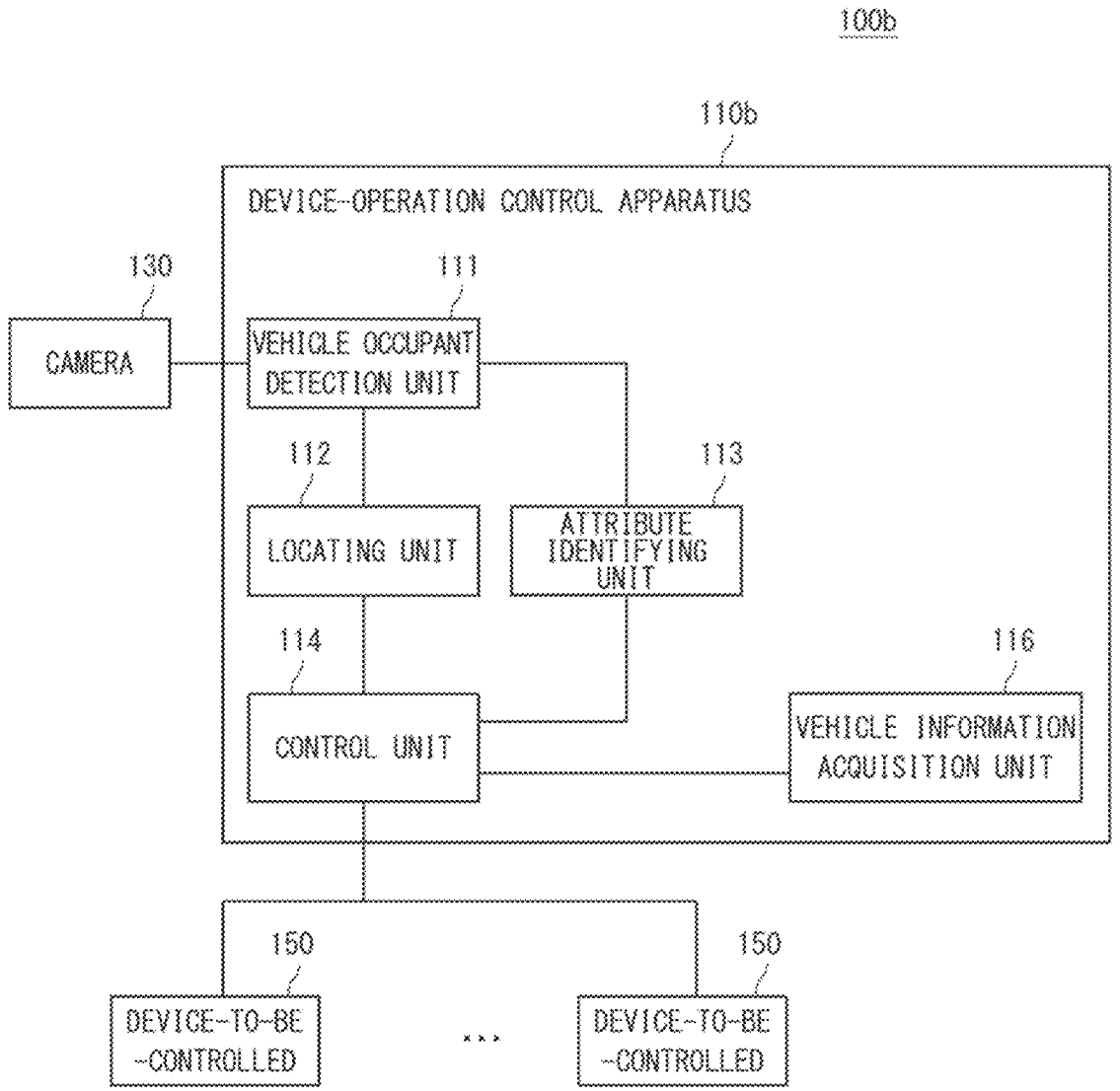
FIG. 7 is a block diagram showing a device-operation control system according to a third example embodiment of the present disclosure.

Next, a third example embodiment of the present disclosure will be described. FIG. 7 shows a device-operation control system according to the third example embodiment of the present disclosure. A device-operation control system 100b according to this example embodiment has a configuration in which a device-operation control apparatus 110a has a vehicle information acquisition unit 116 in addition to the configuration of the device-operation control apparatus 110 described in the first example embodiment shown in FIG. 2. A device-operation control apparatus 110b according to this example embodiment may include the vehicle occupant status acquisition unit 115 like the device-operation control apparatus 110a according to the second example embodiment shown in FIG. 5.

The vehicle information acquisition unit (vehicle information acquisition means) 116 acquires vehicle information. Vehicle information may include information indicating whether the vehicle is being operated, information indicating the position of the shift lever, and operating status information of the parking brake. Vehicle information may include location information of the vehicle. The vehicle information acquisition unit 116 may acquire vehicle information from a device such as an ECU (Electronic Control Unit) that performs control of the vehicle via an in-vehicle network such as a CAN (Controller Area Network).

In this example embodiment, the control unit 114 performs control of a device-to-be-controlled 150 by referring to the vehicle information in addition to the location of the vehicle occupant in the vehicle and the attributes of the vehicle occupant. The control unit 114 may determine, for example, based on vehicle information, whether or not the vehicle is being operated (traveling). The control unit 114 may determine, based on the location information of the vehicle, whether or not the vehicle is parked in a parking lot, a service area, a parking area, or the like. The control unit 114 may determine whether or not the operation of the device-to-be-controlled 150 is to be permitted depending on whether or not it is determined that the vehicle is being operated or is parked.

FIG. 8 shows an example of whether or not the operation of a device-to-be-controlled is to be permitted based on the vehicle status information. The example shown in FIG. 8 is an example when the attributes of the vehicle occupant is "child". In the example of FIG. 8, the control unit 114 restricts the operation of a power window, the engine, and a parking brake when the vehicle is being operated. The control unit 114 permits the operation of the power window and the engine but restricts the operation of the parking brake when the shift lever is in P and the parking brake is ON (the parking brake is in operation). The control unit 114 permits the operation of the power window and the parking brake but restricts the operation of the engine when the shift lever is in P and the parking brake is OFF. In addition to the above, the control unit 114 may restrict use of certain functions, such as a screen display function, of a user device such as a smartphone by a driver while the vehicle is being operated.

In this example embodiment, the vehicle information acquisition unit 116 acquires a vehicle information. The control unit 114 can perform control of the device-to-be-controlled 150 based on the acquired vehicle information. The control unit 114 can determine, for example, whether or not the operation of the device-to-be-controlled 150 by the vehicle occupant is to be permitted depending on whether or not it is determined that the vehicle is in operation and the position of the shift lever. In this way, the control unit 114 can, for example, change its control over the device-to-be-controlled 150 between the case where the vehicle is being operated and the case where the vehicle is not being operated. The control unit 114 prohibits the operation of the device-to-be-controlled 150 related to driving by a child, for example, while the vehicle is being operated. Thus, safety of the vehicle occupants in the vehicle can be enhanced. Other effects may be similar to those described in the first example embodiment or the second example embodiment.

Figure 9:
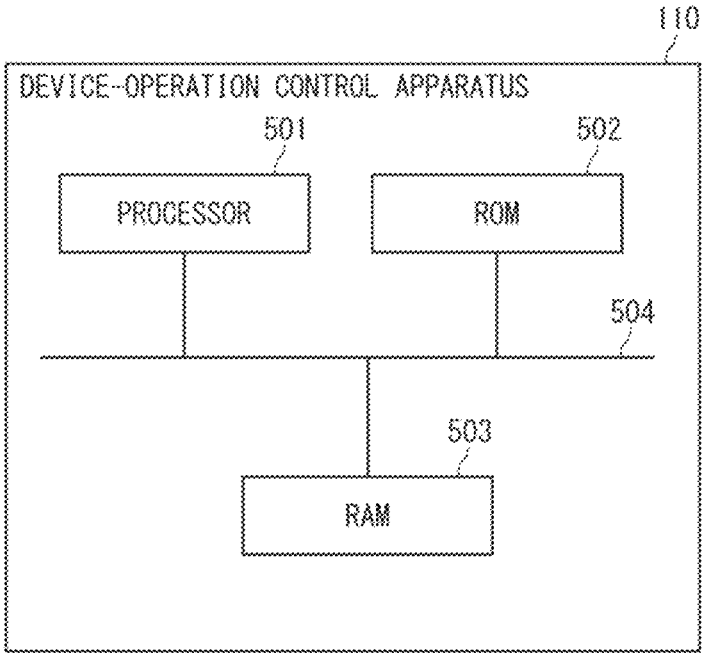
FIG. 9 is a block diagram showing a hardware configuration of a device-operation control apparatus.

Next, the hardware configuration of the device-operation control apparatus 110 will be described. FIG. 9 shows the hardware configuration of the device-operation control apparatus 110. The device-operation control apparatus 110 includes a processor (CPU: Central Processing Unit) 501, a ROM (read only memory) 502, and a RAM (random access memory) 503. In the device-operation control apparatus 110, the processor 501, the ROM 502, and the RAM 503 are connected to one another via a bus 504. The device-operation control apparatus 110 may include other circuitry, such as peripheral circuitry, communication circuitry, and interface circuitry, although illustration thereof is omitted.

The ROM 502 is a nonvolatile storage device. For the ROM 502, for example, a semiconductor storage device such as a flash memory having a relatively small capacity is used. The ROM 502 stores a program to be executed by the processor 501.

The aforementioned program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a RAM, a ROM, a flash memory, a solid-state drive (SSD) or other types of memory technologies, a Compact Disc (CD), a digital versatile disc (DVD), a Blu-ray disc (registered trademark) or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The RAM 503 is a volatile storage device. Various semiconductor memory devices such as DRAM (Dynamic Random Access Memory) or SRAM (Static Random Access Memory) are used for the RAM 503. The RAM 503 can be used as an internal buffer for temporarily storing data, etc.

The processor 501 deploys the program stored in the ROM 502 to the RAM 503 and executes the program. When the CPU 501 executes the program, the functions of each unit in the device-operation control apparatus 110 can be realized.

The device-operation control apparatus 110 need not necessarily be a single apparatus. The device-operation control apparatus 110 may be configured using a plurality of physically separated apparatuses. Further, not all functions of the device-operation control apparatus 110 need to be installed in a vehicle, as long as the device-operation control apparatus 110 is able to control the device-to-be-controlled 150 in a vehicle. For example, in the device-operation control apparatus 110, the attribute identifying unit 113 may be disposed outside the vehicle. In this case, the attribute identifying unit 113 may receive a face image of a vehicle occupant detected by the vehicle occupant detection unit 111 via a wireless communication network. The attribute identifying unit 113 may transmit the identified attributes of the vehicle occupant to the control unit 114 via the wireless communication network.

While the present disclosure has been particularly shown and described with reference to example embodiments thereof, the present disclosure is not limited to these example embodiments, and changes or modifications to example embodiment described above are included in the present disclosure to the extent that they do not depart from the sprit and the scope of the present disclosure.

Some or all of the above example embodiments may be described as in the following supplementary notes, but it is not limited to the following.

Supplementary Note 1

A device-operation control apparatus including:
locating means for identifying a location of at least one vehicle occupant in a vehicle;
attribute identifying means for identifying an attribute of the at least one vehicle occupant from an image captured by a camera for capturing an image of inside of the vehicle; and
control means for performing control of a device inside the vehicle based on the identified location and the identified attribute.

Supplementary Note 2

The device-operation control apparatus according to Supplementary Note 1, wherein the control means is configured to determine, based on the identified location and the identified attribute, whether or not an operation of the device by the at least one vehicle occupant is to be permitted.

Supplementary Note 3

The device-operation control apparatus according to Supplementary Note 1 or 2, wherein the attribute identifying means is configured to estimate an age of the vehicle occupant and identify the attributes of the at least one vehicle occupant based on the estimated age.

Supplementary Note 4

The device-operation control apparatus according to any one of Supplementary Notes 1 to 3, wherein
the attribute identifying means is configured to identify whether the vehicle occupant is an adult or a child as the attribute of the vehicle occupant, and
the control means is configured to determine whether or not the operation of the device by the vehicle occupant is to be permitted based on the location of the vehicle occupant and whether the vehicle occupant is an adult or a child.

Supplementary Note 5

The device-operation control apparatus according to any one of Supplementary Notes 1 to 3, further including vehicle occupant status acquisition means for acquiring vehicle occupant status information based on the image, wherein
the control means is further configured to perform control of the device based on the status information.

Supplementary Note 6

The device-operation control apparatus according to Supplementary Note 5, wherein the vehicle occupant status acquisition means is configured to acquire a face orientation or a line of sight of the vehicle occupant as the status information.

Supplementary Note 7

The device-operation control apparatus according to Supplementary Note 6, wherein
the attribute identifying means is configured to identify whether the vehicle occupant is an adult or a child as the attribute of the vehicle occupant, and
when there is more than one vehicle occupant in the vehicle, the control means determines whether or not the vehicle occupant identified as an adult looks at the vehicle occupant identified as a child based on the face orientation or the line of sight of the vehicle occupant, and, depending on whether or not it is determined that the vehicle occupant identified as an adult looks at the vehicle occupant identified as a child, determines whether or not the operation of the device by the vehicle occupant identified as a child is to be permitted.

Supplementary Note 8

The device-operation control apparatus according to any one of Supplementary Notes 1 to 7, further including vehicle information acquisition means for acquiring vehicle information of the vehicle,
wherein the control means is further configured to perform control of the device based on the vehicle information.

Supplementary Note 9

A device-operation control system including:
a camera for capturing an image of inside of a vehicle; and
a device-operation control apparatus for performing control of a device inside the vehicle,
wherein the device-operation control apparatus includes:
a camera for capturing an image of inside of a vehicle; and
a device-operation control apparatus for performing control of a device inside the vehicle,
wherein the device-operation control apparatus includes:
locating means for identifying a location of at least one vehicle occupant in the vehicle;
attribute identifying means for identifying an attribute of the at least one vehicle occupant from an image captured by the camera; and

control means for performing control of the device based on the identified location and the identified attribute.

Supplementary Note 10

The device-operation control system according to Supplementary Note 9, wherein the control means is configured to determine whether or not an operation of the device by the vehicle occupant is to be permitted based on the identified location and the identified attribute.

Supplementary Note 11

The device-operation control system according to Supplementary Note 9 or 10, wherein the attribute identifying means is configured to estimate an age of the vehicle occupant and identify the attribute of the vehicle occupant based on the estimated age.

Supplementary Note 12

A device-operation control method including:
identifying a location of at least one vehicle occupant in a vehicle;
identifying an attribute of the at least one vehicle occupant from an image captured by a camera for capturing an image of inside of the vehicle; and
performing control of a device inside the vehicle based on the identified location and the identified attribute.

Supplementary Note 13

A non-transitory computer-readable medium that stores a program for causing a processor to execute processes including:
identifying a location of at least one vehicle occupant in a vehicle;
identifying an attribute of the at least one vehicle occupant from an image captured by a camera for capturing an image of inside of the vehicle; and
performing control of a device inside the vehicle based on the identified location and the identified attribute.

REFERENCE SIGNS LIST

10: DEVICE-OPERATION CONTROL SYSTEM
20: DEVICE-OPERATION CONTROL APPARATUS
21: LOCATING MEANS
22: ATTRIBUTE IDENTIFYING MEANS
23: CONTROL MEANS
30: CAMERA
50: DEVICE
100: DEVICE-OPERATION CONTROL SYSTEM
110: DEVICE-OPERATION CONTROL APPARATUS
111: VEHICLE OCCUPANT DETECTION UNIT
112: LOCATING UNIT
113: ATTRIBUTE IDENTIFYING UNIT
114: CONTROL UNIT
115: VEHICLE OCCUPANT STATUS ACQUISITION UNIT
116: VEHICLE INFORMATION ACQUISITION UNIT
130: CAMERA
150: DEVICE-TO-BE-CONTROLLED
501: PROCESSOR
502: ROM
503: RAM

14

What is claimed is:
1. A device-operation control apparatus comprising:
at least one memory storing instructions; and
at least one processor configured to execute the instructions to:
identify a location of at least one vehicle occupant in a vehicle;
identify, for each of the at least one vehicle occupant, whether the vehicle occupant is an adult or a child as an attribute of the vehicle occupant from an image captured by a camera for capturing an image of inside of the vehicle;
acquire a face orientation or a line of sight of the vehicle occupant as status information based on the image;
determine, in a case where there is more than one vehicle occupant in the vehicle, whether or not the vehicle occupant identified as an adult looks at the vehicle occupant identified as a child based on the face orientation or the line of sight of the vehicle occupant, and, depending on whether or not it is determined that the vehicle occupant identified as an adult looks at the vehicle occupant identified as a child, determine whether or not the operation of the device by the vehicle occupant identified as a child is to be permitted; and
performing control of a device inside the vehicle based on the identified location and the identified attribute.

2. The device-operation control apparatus according to claim 1, wherein the at least one processor is configured to execute the instruction to determine, based on the identified location and the identified attribute, whether or not an operation of the device by the at least one vehicle occupant is to be permitted.

3. The device-operation control apparatus according to claim 1, wherein the at least one processor is configured to execute the instructions to estimate an age of the vehicle occupant and identify the attribute of the at least one vehicle occupant based on the estimated age.

4. The device-operation control apparatus according to claim 1, wherein
the at least one processor is configured to execute the instructions to:
determine whether or not the operation of the device by the vehicle occupant is to be permitted based on the location of the vehicle occupant and whether the vehicle occupant is an adult or a child.

5. The device-operation control apparatus according to claim 1,
the at least one processor is configured to execute the instructions to:
acquire vehicle information of the vehicle, and
perform control of the device based on the vehicle information.

6. A device-operation control system comprising:
a camera for capturing an image of inside of a vehicle; and
the device-operation control apparatus according to claim 1.

7. The device-operation control system according to claim 6, wherein the at least one processor is configured to execute the instructions to determine whether or not an operation of the device by the vehicle occupant is to be permitted based on the identified location and the identified attribute.

8. The device-operation control system according to claim 6, wherein the at least one processor is configured to execute the instructions to estimate an age of the vehicle occupant and identify the attribute of the vehicle occupant based on the estimated age.

9. A device-operation control method comprising:

identifying a location of at least one vehicle occupant in a vehicle;

identifying, for each of the at least one vehicle occupant, whether the vehicle occupant is an adult or a child as an attribute of the vehicle occupant from an image captured by a camera for capturing an image of inside of the vehicle;

acquiring a face orientation or a line of sight of the vehicle occupant as status information based on the image;

determining, in a case where there is more than one vehicle occupant in the vehicle, whether or not the vehicle occupant identified as an adult looks at the vehicle occupant identified as a child based on the face orientation or the line of sight of the vehicle occupant, and, depending on whether or not it is determined that the vehicle occupant identified as an adult looks at the vehicle occupant identified as a child, determine whether or not the operation of the device by the vehicle occupant identified as a child is to be permitted; and performing control of a device inside the vehicle based on the identified location and the identified attribute.

10. A non-transitory computer-readable medium that stores a program for causing a processor to execute processes comprising:

identifying a location of at least one vehicle occupant in a vehicle;

identifying, for each of the at least one vehicle occupant, whether the vehicle occupant is an adult or a child or as an attribute of the vehicle occupant from an image captured by a camera for capturing an image of inside of the vehicle;

acquiring a face orientation or a line of sight of the vehicle occupant as status information based on the image;

determine, in a case where there is more than one vehicle occupant in the vehicle, whether or not the vehicle occupant identified as an adult looks at the vehicle occupant identified as a child based on the face orientation or the line of sight of the vehicle occupant, and, depending on whether or not it is determined that the vehicle occupant identified as an adult looks at the vehicle occupant identified as a child, determine whether or not the operation of the device by the vehicle occupant identified as a child is to be permitted; and performing control of a device inside the vehicle based on the identified location and the identified attribute.

* * * * *